United States Patent [19]

Sexton

[11] 4,046,621

[45] Sept. 6, 1977

[54] PROCESS FOR TREATING A SLURRY OF CELLULOSIC MATERIAL

[75] Inventor: Ernest Arthur Sexton, St. Catharines, Canada

[73] Assignees: The Ontario Paper Company Limited, Thorold; Canadian International Paper Company, Montreal, both of Canada

[21] Appl. No.: 625,819

[22] Filed: Oct. 28, 1975

Related U.S. Application Data

[62] Division of Ser. No. 533,692, Dec. 17, 1974.

[51] Int. Cl.² .......................... D21C 9/06; D21C 9/18
[52] U.S. Cl. ......................................... 162/40; 8/156; 162/49; 162/53; 162/60; 162/190; 162/198; 162/208; 162/217; 210/77; 324/30 R; 324/30 B; 324/71 R
[58] Field of Search .................. 162/53, 60, 189, 190, 162/208, 217, 258, 264, 100, 363, 364, 29, 49, 198, 38, 263, 37, 40; 252/361, 321; 324/30 R, 30 B, 71 R; 8/156; 55/87, 178; 210/65, 66, 67, 69, 77

[56] References Cited

U.S. PATENT DOCUMENTS

| | | | |
|---|---|---|---|
| 307,707 | 11/1884 | Byerley | 210/400 X |
| 1,204,083 | 11/1916 | Starr | 162/353 X |
| 1,648,111 | 11/1927 | Collins | 162/29 |
| 1,881,404 | 10/1932 | Hadley | 162/208 |
| 1,983,572 | 12/1934 | Statham et al. | 162/190 X |
| 2,034,784 | 3/1936 | Wallny | 210/197 |
| 2,073,654 | 3/1937 | Smiley | 162/190 |
| 2,314,294 | 3/1943 | Wallny | 210/197 |
| 2,346,500 | 4/1944 | Moore | 134/30 |
| 2,360,779 | 10/1944 | Lang et al. | 162/60 |
| 2,431,009 | 11/1947 | Young | 252/361 X |
| 2,466,290 | 4/1949 | Wells | 162/49 |
| 2,490,421 | 12/1949 | Denhard | 252/361 |
| 2,677,467 | 5/1954 | Giorgini | 210/198 |
| 2,738,880 | 3/1956 | Whitney | 210/197 |
| 2,873,028 | 2/1959 | Bried | 210/401 |
| 2,906,402 | 9/1959 | Blankevoort | 210/400 |
| 2,981,329 | 4/1961 | Justus | 162/217 X |
| 2,983,383 | 5/1961 | Wallace et al. | 210/97 |
| 2,999,785 | 9/1961 | Richter et al. | 162/60 |
| 3,102,278 | 9/1963 | Reichle et al. | 8/151.2 |
| 3,104,223 | 9/1963 | Kasuya | 210/400 |
| 3,161,522 | 12/1964 | Compton | 210/400 X |
| 3,162,567 | 12/1964 | Heller | 162/348 |
| 3,190,790 | 6/1965 | Ploetz et al. | 162/212 |
| 3,199,126 | 8/1965 | Chaikin et al. | 8/156 |
| 3,200,949 | 8/1965 | Aulich et al. | 210/205 |
| 3,294,623 | 12/1966 | Brinkley et al. | 162/19 |
| 3,425,899 | 2/1969 | Nilsson | 162/30 |
| 3,454,970 | 7/1969 | Sutherland | 162/60 X |
| 3,553,075 | 1/1971 | Rivers | 162/49 |
| 3,563,854 | 2/1971 | Nisser et a. | 162/353 |
| 3,564,631 | 2/1971 | Burling | 8/156 |
| 3,573,158 | 3/1971 | Pall et al. | 162/208 X |
| 3,676,979 | 7/1972 | Schuette | 53/112 A |
| 3,679,543 | 7/1972 | Rivers | 162/49 |
| 3,692,624 | 9/1972 | Yrjala | 162/49 |
| 3,849,313 | 11/1974 | Lopker | 210/400 |
| 3,886,035 | 5/1975 | Laakso | 162/55 |

OTHER PUBLICATIONS

MacLoed, "Pollution Abatement with a Plus-Alnique Chemical Recovery, Plant" Pulp & Paper, (8-1974).
Fell et al., "Ontario Paper Starts Up a Pollution Control System" Pulp & Paper Canada, vol. 76, No. 4, 4-1975, pp. 80-83.
Tomiak, "Countercurrent Pulp Washing-Recovery Calculations" PPMC, 75(9), 9-1974, pp. T331-T336.
Tombler et al., "Comparison of Brown Stock Washing Systems," Environment Canada Project Report 82-1, 7-1973.

*Primary Examiner*—Arthur L. Corbin
*Attorney, Agent, or Firm*—Ronald A. Schapira

[57] ABSTRACT

A slurry of cellulosic material is diluted to a flowable consistency and subjected to a pressure differential on a permeable surface to increase the slurry consistency to a value between the consistency of the diluted slurry and the consistency of the slurry prior to dilution thereby forming a mat of cellulosic material on the permeable surface. The liquid and solids which pass through the permeable surface as a result of the pressure differential are recycled for use as slurry diluent, and to the mat of cellulosic material, while the mat remains on the permeable surface and subject to the pressure differential, is countercurrently applied, in a plurality of treatment stages, a treating liquid, such as a wash liquid, including application of a fresh treating liquid to said mat in the last stage of said treatment stages, whereby the treating liquid displaces at least a portion of liquid present in said mat from said mat and through the permeable surface in each treatment stage. The electrical conductivity of the liquid displaced from said mat in the last stage of said treatment stages is measured, and the amount of fresh treating liquid applied in the last stage of said treatment stages is adjusted in response to the deviation, from a predetermined norm, of the measured value of electrical conductivity of only the liquid displaced in the last stage of said treatment stages.

7 Claims, 6 Drawing Figures

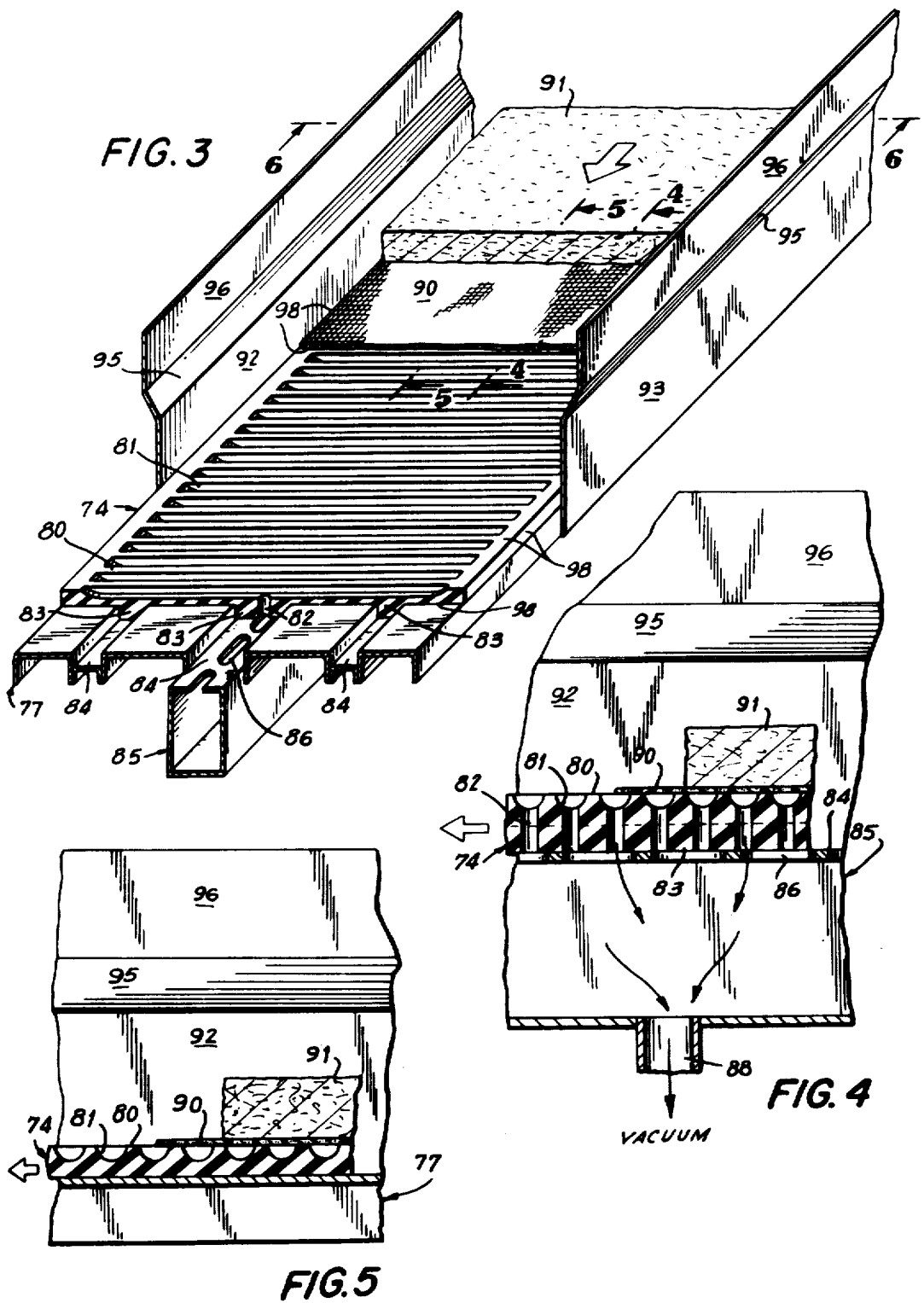

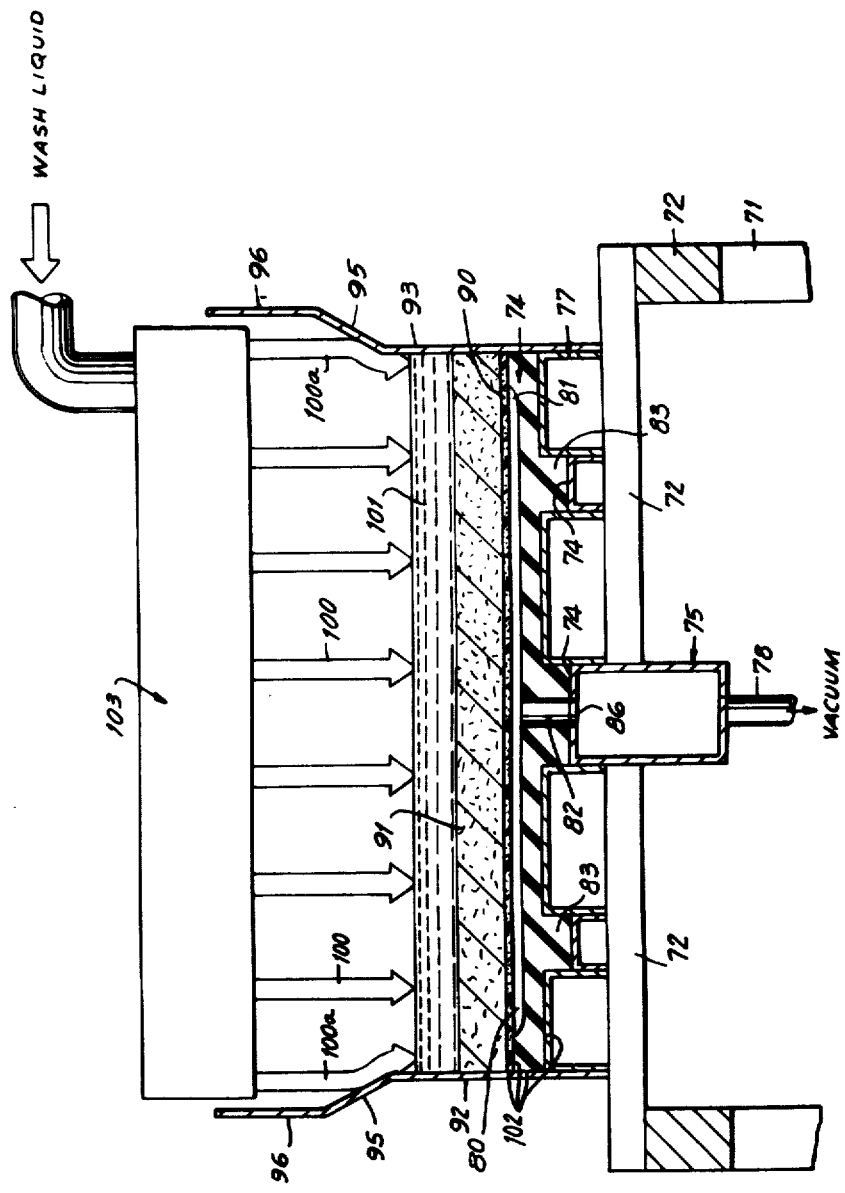

PROCESS FOR TREATING A SLURRY OF CELLULOSIC MATERIAL

This is a division, of application Ser. No. 533,692, filed Dec. 17, 1974, entitled "Process and Apparatus for Treating a Cellulosic Slurry", as filed.

BACKGROUND OF THE INVENTION

This invention relates to a process and apparatus useful in the treatment of slurries of cellulosic material. In general, it has applicability to any such treatment wherein it becomes desirable to increase the consistency of the slurry, as, for example, by filtration, and wherein some of the cellulosic material "breaks through" the filtering medium. It is particularly applicable when the slurry is filtered on a horizontal belt type filtering apparatus and the filter cake then contacted with a treatment liquid, while still on the horizontal filter medium, which displaces at least a portion of the liquid carried by the filter cake. Thus, for example, the invention finds utility in the recovery of the liquor associated with the digester stock in a conventional pulp producing operation, such liquor often referred to by those skilled in the art as the "black liquor" or "digester liquor". The digester stock is normally a relatively non-flowable slurry of pulp and digester liquor which must be diluted to a flowable consistency before it can be further processed. As is known in the art, recovery of the digester liquor generally involves one or more filtrations of the diluted digester stock to remove the digester liquor from the pulp solids, the objective being to recover as much of the liquor as possible for regeneration of the pulping chemicals, and to provide as liquor-free or clean a pulp as possible for further processing.

At the present time, probably the most common commercial procedure for recovering digester liquor involves filtering the diluted digester slurry on a rotary drum vacuum filter. Since one filtration ordinarily does not suffice the filter cake is typically reslurried with wash water and then filtered again on the rotary filter. This sequence is repeated as many times as required, usually in counter-current fashion, to obtain the desired recovery of digester liquor. The recovered digester liquor is then further processed in accordance with conventional procedures.

A major disadvantage of the drum filters is that the recovered digester liquor is usually significantly diluted as the result of being mixed with water during the reslurrying operation. This dilution effect is further aggravated by the fact that drum filters require very low slurry consistencies for most efficient operation and hence substantial amounts of water are required in the reslurrying of the filter cake. Because the pulp and digester liquor retained thereby is contacted with copious amounts of wash liquid during the reslurrying step, the pulp solids are eventually washed free of the digester liquor by predominantly a dilution effect.

A highly diluted digester liquor is a process disadvantage because the normal procedure in many pulping processes is to burn the digester liquor to remove the volatiles and recover te non-voltatile components for eventual recycle to the digester system. Unfortunately, however, the liquor cannot be effectively burned it unduly diluted, and the common practice, therefore, is to subject the recovered digester liquor to an energy consuming evaporation-concentration step prior to burning it to increase its concentration to a burnable level. In short, a good portion of the water deliberately added in the liquor recovery operation must now be removed. It is apparent, therefore, that a process for recovering the digester liquor in a highly undiluted state would be most advantageous.

A number of solutions have been proposed to overcome the dilution problem. One such solution involves the replacement of the drum filtration apparatus by a horizontal belt filtering apparatus wherein the diluted digester slurry is deposited on a flat advancing horizontal filter medium operating under vacuum. The digester liquor is sucked from the slurry leaving a mat of pulp on the filter medium. Wash water is then applied to the mat surface. As the wash water enters the mat, it "displaces" the digester liquor therein by what is believed to be essentially a plug-flow mechanism in which very little dilution of the displaced liquid by the treatment liquid takes place. As a result, the mat can be washed in this fashion to recover the digester liquor contained therein in a relatively undiluted condition. The mat is normally washed counter-currently while it remains on the flat advancing filter medium. On the general concept of recovering digester liquor in a substantially undiluted condition by filtering the pulp slurry and then counter-currently washing the pulp mat on a horizontal belt filter, see the work of G. Tombler et al. reported in ENVIRONMENT CANADA Project Report 82-1 "Comparison of Brown Stock Washing Systems" (July, 1973), available from CPAR Secretariat, Canadian Forestry Service, Dept. of the Environment, Ottawa, Canada, K1A OH3, said publication incorporated herein by reference.

It has been found, however, that despite the advantages in using a horizontal belt filter, there are a number of problems associated with such a process which detract from its usefulness. One major disadvantage is the break-through of pulp through the filter medium, especially during the initial formation of the pulp mat. The practical efficient usage of a horizontal belt filter requires that the filter medium be (1) highly durable, (2) resist plugging, and (3) provide an acceptable drainage rate. For these reasons, it is the common practice in the trade to fabricate the filtering medium from a weave of rather coarse but strong filaments, e.g., of diameter of 10 mils or greater. This, coupled with the need for a relatively high percentage open area to provide the desired drainage rate and plug resistance required, results in the filter medium passing not only the liquid phase of the cellulosic slurry deposited thereon but also some of the pulp itself. Pulp break-through normally continues until an appreciable pulp mat builds up on the filtering medium. It has been found, for example, that anywhere from about 0.1 to 1.5% of the pulp may break through and be lost if some sort of recovery system is not provided. At a present pulp value of about $300/ton, such losses would not be acceptable.

Another problem encountered with the use of a horizontal belt filtering apparatus is the foaming of the various digester liquor streams separate from the pulp. This foaming arises from a combination of several factors. First, the digester liquor is under vacuum since vacuum is used to assist the filtration and/or washing operation. Secondly, the digester liquor is relatively hot, e.g., on the order of about 200° F. and thus near its atmospheric boiling point. Thirdly, the digester liquor includes surface active agents. Finally, breaks in the filter vacuum can occur from time to time because of poor sealing, causing temporary injections or surges of air into the separated digester liquor. The foaming which results can be quite serious and extensive. The problem is that the foam becomes entrained in the gas streams of the vacuum system and is lost to the process through the vacuum system exhaust. In addition to making day-to-day operation more difficult, a more serious problem of the foaming is the loss of digester liquor it can cause. For example, anywhere from about 2 to 13% or more of the digester liquor can be lost through foaming, adversely affecting the economics of the process.

The loss of vacuum referred to above usually occurs because of the difficulty of adequately sealing the edges of the filtering medium and its supporting filter belt. The thickness of the filaments making up the filter medium further aggravates this problem by preventing an air-tight seal at the edges.

Another problem of the use of horizontal belt filters is the difficulty of establishing or re-establishing equilibrium or steady-state operation, particularly in the counter-current washing operation, either during start-up or once an upset has been introduced into the system. These difficulties make routine, efficient operation more difficult.

It is toward the solution of these problems that the present invention is directed, and toward the provision of a technique for effectively utilizing the advantageous low dilution characteristics of the horizontal belt filtering and washing system, but without the previously encountered drawbacks of the system.

It will be apparent, however, that the features provided by the present invention are not limited to the concept of a horizontal belt filter medium to recover digester liquor from a digester slurry, but can be applied with equal advantageous effect in any system wherein the consistency of a slurry of cellulosic material is increased to form a mat of cellulosic material and the mat then contacted with a treatment liquid, counter currently or otherwise such as, for example, a chemical reactant or a wash liquid, with the objective of having the treatment liquid displace the liquid contained in the mat, with or without a chemical reaction between the treatment liquid and the cellulosic material and/or displaced liquid.

It is, therefore, a principal object of the invention to provide a process for recovering all the cellulosic material which "breaks through" a filtering medium, such as a horizontal belt filter, when a diluted slurry of the cellulosic material is deposited thereon and its consistency increased to form a mat of the cellulosic material.

It is another object of this invention to provide a process wherein said "break-through" cellulosic material is recovered without the need for a separate recovery circuit.

It is another object of this invention to provide a process for defoaming the liquid which passes through a filtering medium, such as a vacuum-operated horizontal belt filter, and recovering the defoamed product.

It is a further object of the invention to provide a process for conveniently establishing or re-establishing equilibrium or steady-state operation during the counter-current contacting of a mat of cellulosic material disposed on a filtering medium, such as a horizontal belt filter, with a treatment liquid which displaces the liquid contained in the mat.

It is another object of this invention to provide an apparatus for reducing loss of vacuum in the operation of a horizontal belt filtering apparatus.

These and other objects of the invention will be apparent to those skilled in the art upon a consideration of this entire specification and the accompanying drawings.

SUMMARY OF THE INVENTION

The above objectives are accomplished, in accordance with the invention, by (a) diluting the slurry of cellulosic material to a flowable consistency, (b) depositing the diluted slurry on a surface permeable to the liquid and solid phase thereof but which is substantially more permeable to the liquid phase, (c) subjecting the deposited slurry to a pressure differential whereby substantially more of the liquid than the solids phase passes through the permeable surface to increase the consistency of the slurry to a value between the consistency of the diluted slurry deposited on the surface and the consistency of the undiluted slurry, thereby forming a mat of cellulosic material on said surface, and (d) recycling the liquid and solids which pass through the surface for use as the slurry diluent in step (a). As used herein, the term "consistency" refers to the average consistency of a slurry or mat.

Thus, for example, if the undiluted slurry, prior to its dilution is step (a), had a consistency of 12% and was diluted in step (a) to a consistency of 3%, the slurry consistency would be increased in step (c) from 3% to a value which did not exceed about 12%. Preferably, the slurry consistency would be increased to a value quite close to 12%. By deliberately holding the increasee in consistency to a maximum of about 12%, the recycle loop can be in only one of two possible conditions. First, if the consistency is increased in step (c) to 12%, the recycle loop will be in balance since then the amount of liquid removed when the mat is formed will correspond exactly to that needed to dilute the 12% slurry to 3%. Consequently, there will always be just enough liquid in the recycle loop to dilute the slurry in step (a) from 12% to 3%. The second possible condition of the recycle loop occurs when the consistency in step (c) is increased to a value less than 12%. Then there will be a deficiency in the recycle loop since not all the diluent liquid added in step (a) is removed in step (c). Consequently, the recycle loop will be incapable of supplying all of the requisite diluent liquid for step (a). However, this deficiency can be readily supplied by a make-up injection of material into the recycle loop from any convenient source such as from the liquid product stream withdrawn from the process. The amount of make-up liquid required would be directly proportional to the difference between the consistency of the mat produced in step (c) and 12%.

Consider now the situation where, contrary to the present invention, the consistency is increased in step (c) to above 12%. Then the recycle loop would be over-loaded because more liquid would be removed in step (c) than was needed to dilute the slurry in step (a). To maintain such a system in balance it would then be necessary to purge a portion of the material from the recycle loop. Since the material flowing in the recycle loop can contain substantial amounts of valuable cellulosic solids as pointed out above, these purged solids would either be lost or a separate cellulose recovery system separate from the recycle loop would be required. As is now apparent, however, recovery of all the "break-through" cellulosic material is achieved, in accordance with the present invention, solely by use of a recycle loop, provided the slurry consistency is not increased in step (c) above about 12%, the consistency of the undiluted feed slurry.

While this aspect of the invention is particularly useful in connection with the processing of digester slurries in order to recover therefrom the digester liquor in as undiluted a condition as possible, it is apparent that this unique concept of a recycle loop can be advantageously applied in any situation involving the separation of a slurry of cellulosic material into its solid and liquid phases where one encounters the problem of cellulose breaking through the separation medium. While the normal expedient in such cases would be to separate as much liquid as possible from the solids during the separation step thus requiring less treatment downstream to remove and/or recover residual liquid, it can now be appreciated that were this course to be followed, it would result in the loss of valuable cellulose or else the need for a separate cellulose recovery system. It is only when the slurry consistency is increased during the mat-forming stage to a value equal to or below the consistency of the undiluted slurry that a single recycle loop will recover all the break-through cellulose.

This unique recycle feature can, of course, be advantageously employed regardless of the nature of the treatment to which the cellulosic mat is subsequently treated. It is, however, particularly useful in the situation where the mat will be treated counter-currently or otherwise, while still deposited on the filtering medium, with a treatment liquid which will pass through the mat in substantially a plug-flow mode of movement to displace the liquid contained in the mat with as little dilution as possible of the displaced liquid by the treatment liquid. The treatment liquid can effect a purely physical displacement of the liquid in the mat, as where the liquid is merely being washed out of the mat by displacement, or it can effect a physical displacement of the liquid in the mat coupled with a chemical reaction between the cellulosic material, the liquid contained in the mat, or both. For example, the treatment solution could be a pulp bleaching solution wherein the objective is to rapidly bleach the pulp or a caustic solution wherein the pulp is to be given a caustic treatment.

The unique recycle loop of the present invention is particularly useful in conjunction with any horizontal belt filtering operation wherein the problem of solids break-through is especially troublesome. However, it will now be apparent that the loop could be advantageously applied in any liquid-solid separation system wherein there was a dilution of a slurry prior to the separation step, and wherein solids break-through took place during the separation step and recovery of such solids was desired.

Following the formation of the diluted slurry into a mat of cellulosic material whose consistency does not exceed the consistency of the undiluted slurry, the mat can then be conveniently treated with a treatment liquid in one or more stages, counter-current or otherwise, wherein the treatment liquid displaces residual liquid contained in the mat. For example, the mat can be counter-currently washed with an aqueous wash liquid while still under vacuum on the horizontal filter belt.

As pointed out above, the liquid sucked through the filtering medium in both the mat-forming and washing stages of the process often has a pronounced tendency to foam. This is especially so when the liquid is a digester liquor. This problem is overcome by directing the foamy portions of such streams, which normally is a gas stream in which the foam is entrained, to a defoaming apparatus where the foam is broken or collapsed. The defoamed product can then be readily separated from its carrier gas stream and returned to the system or otherwise recovered, thereby preventing loss of this material through the vacuum system exhaust.

If the mat is to be counter-currently treated while still on the horizontal belt filter, fresh treatment liquid will be introduced in the final wash stage. While the amount of fresh wash liquid required during steady-state or equilibrium operation is generally fixed and easily controlled, such is not the case when the system is in a transient state such as during start-up or during periods of upsets. During such periods there can be significant variations and fluctuations in the amount of wash water required for effective washing or other treatment, and unless such variations are quickly and accurately continuously compensated for, considerable amounts of time may be required before the system will achieve steady state operation. This time is normally wasted time since during this period the process does not produce a useful output.

To alleviate this situation, it has been found that the amount of fresh treatment liquid required at a given time, during transient operation or otherwise, can be conveniently supplied in controlled amounts in response to a signal initiated by measuring the electrical conductivity of the liquid displaced from the mat in the last treatment stage. Electrical fconductivity changes as the concentration of solutions such as a digester liquor change, and it will generally be known from simple calibration data what electrical conductivity value corresponds to the acceptable and desired concentration of the liquid. The extent to which the actual measured electrical conductivity deviates from this desired norm is computed by an intervening controller means which then transmits a variable input signal corresponding to the extent of the deviation to a control valve on the fresh washing fluid inlet line. The control valve will then admit more or less washing liquid, as required, to minimize the deviation from the norm to substantially zero. Since variations in electrical conductivity will be almost instantaneously transmitted to the control valve, the system will quickly and automatically adjust itself to the desired steady-state operating conditions, and maintain these conditions with minimum disturbance. This continuous, rapid, automatic adjustment of the amount of fresh treatment liquid required will quickly dampen out transient operation and impose steady-state conditions on the treatment operation.

To alleviate the loss of vacuum due to poor seals at the edge of the horizontal belt filter and elsewhere in the system, the movable belt filter element is disposed in a troughshaped support tray generally having a horizontal base portion on which the underside of the belt rests and two wall members rising upwardly from each side of the base portion to a height well above that of the top surface of the belt. As a slurry or liquid is deposited on the belt, the wall members contain it and create a liquid layer across the belt between the two wall members. Since the edges of the belt are immersed in this liquid, this creates a liquid seal along the edges of a filter belt and filter medium which effectively prevents air leaks into the vacuum system at these ordinarily vulnerable points.

The invention will now be described in greater detail with reference to the preferred embodiments thereof and the accompanying drawings depicting these embodiments.

BRIEF DESCRIPTION OF THE DRAWINGS

FIG. 3 is a schematic illustration, viewed in perspective from the downstream end, of a portion of the apparatus shown in FIG. 2, partly cut-away to better illustrate the improvement of the present invention and show the underlying parts of the apparatus not shown in FIG. 2.

FIGS. 4 and 5 are sectional views taken generally along the lines 4—4 and 5—5, respectively, of FIG. 3.

FIG. 6 is a sectional view taken generally along the line 6—6 of FIGS. 2 and 3, with a further showing of the washing of a mat or filter cake on the filtration surface of the apparatus.

DESCRIPTION OF THE PREFERRED EMBODIMENTS

Figure 1:
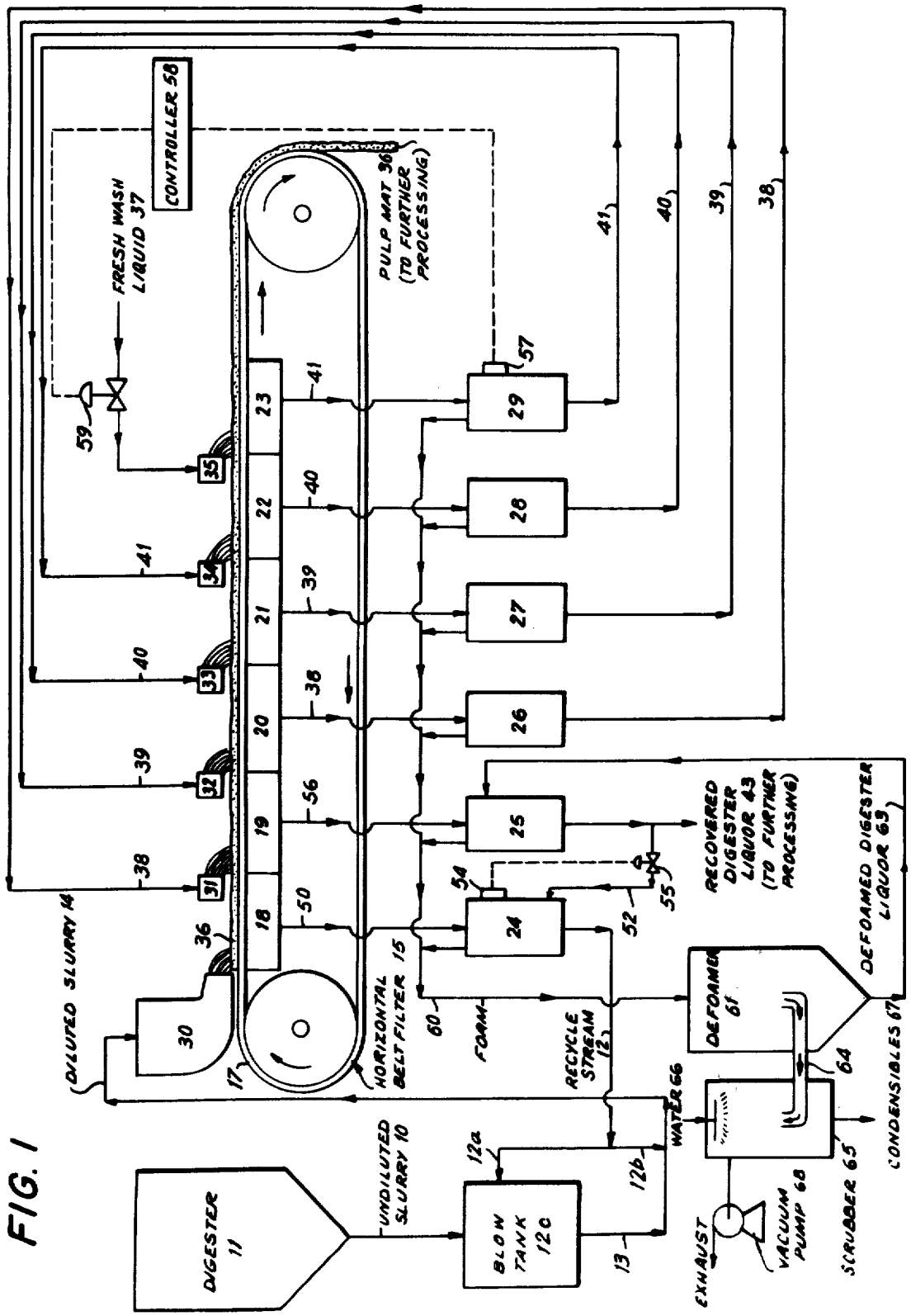
FIG. 1 is a schematic illustration of a preferred embodiment of the process aspects of the present invention.

FIG. 1 depicts schematically a preferred embodiment of the invention wherein digester liquor from a pulping process is recovered from a cellulosic pulp using a horizontal filter and aqueous counter-current displacement washing of the pulp on the filter. A principal advantage of this aspect of the invention is that virtually all the digester liquor can be recovered from the pulp in a highly non-diluted form so that further concentration of the liquor prior to burning it is minimized.

Referring now to FIG. 1, the basic feedstock to the process is the undiluted hot stock or cellulosic slurry 10 produced in the digester 11 of a conventional pulping process such as, for example, any of the various well-known pulping processes whether of a mechanical, semi-chemical or chemical nature. Illustratively the stock in digester 11 is produced by the Kraft pulping process. There are, of course, numerous pulping processes well-known to those skilled in the art which need not be repititiously repeated herein, all of which produce acceptable cellulose feed slurries for use in the present invention. See for example, any of those disclosed on page 284 of *Pulping Processes* by Sven A. Rydholm, Interscience Publishers (1965), said publication incorporated herein by reference. These disgester slurries as produced normally have a consistency of about 10 to 14% and preferably about 11 to 13%. A number of the more common commercial pulping processes operate at a digester consistency of about 11 to 12%. Consistency, of course, refers to the amount of cellulosic solids present in the slurry on a dry basis.

The digester stock 10 is next blown into a blow tank 12c. Because of its relatively high consistency, the digester stock tends to be a relatively non-flowable, porridge-like mass. To render the stock more flowable so that it can be pumped for further processing, it is diluted to a lower consistency, e.g., to about 0.5 to 4%, and preferably to about 2 to 4%. This is conveniently done by admixing with the slurry 10 recycled digester liquor 12 in the desired amount. As shown in FIG. 1, a first portion 12a of the recycle diluent 12 is added to the slurry 10 in the blow tank 12c to reduce the consistency of the slurry 13 leaving the blow tank 12c to about 7 to 9%. Slurry 13 is further diluted with a second portion 12b of the recycle diluent 12 to yield a fully diluted slurry 14 having the preferred consistency of about 2 to 4%. There are, of course, numerous other ways in which stream 12 could be used to dilute the digester slurry 10 to its desired consistency. For example, more than two separate dilution steps could be used, or some of the diluent 12 could be fed into the cone of the digester 11 or into the blow line between digester 11 and the blow tank 12c to facilitate blowing of the stock.

The diluted slurry 14 is then fed to the horizontal belt filter 15. The filtering apparatus can be selected from any of a number of such apparatus which are commercially available. As shown in FIG. 1, such apparatus generally comprise an endless filter medium 17 which passes over one or more vacuum pans 18–23 which, in turn, drain into one or more tanks 24–29 which are connected to a vacuum manifold 60. The apparatus shown in FIG. 1 is provided with a feed headbox 30 and five additional headboxes 31-35. Headboxes 31-35 are provided in order to subject the pulp mat 36 formed as the slurry 14 passes over the first vacuum box 18 to a five stage counter-current wash. Fresh wash liquid 37 is fed to the final mat washing stage (headbox 35). Recycled was streams 38–41 from tanks 26–29, respectively, are fed to the four preceding mat washing stages (headboxes 31-34, respectively). The material 50 deposited in tank 24 is recycled as the diluent stream 12 for slurry 10, as discussed in greater detail below. Liquid deposited in tank 25 represents the liquid removed from the mat in its first wash stage and constitutes the recovered digester liquor 43 of the process.

A preferred type of belt filtering apparatus is the "Eimco Separator", an apparatus available commercially from the Processing Machinery Division of Eimco Corporation, Salt Lake City, Utah. The Emico separator employs a ribbed flexible belt on which a filter medium is disposed, as shown in FIGS. 2 to 6. Another suitable belt fastening apparatus is available from Sanduik Canadian limited, Montreal, Cannada. The Sanduik device employs either a flexible, apertured, un-ribbed stainless steel filter belt or a ribbed stainless steel filter belt on which a filter medium can be disposed. Whatever apparatus is used, it will preferably incorporate the improved trough for the filter belt and filter medium shown in FIGS. 2 to 6. The nature and origin of the recycle stream 12 used to dilute the digester stock 10 is described in greater detail below.

The diluted pulp slurry 14 is fed to a headbox 30 which deposits the dilute slurry on the advancing endless filter medium 17. Since the filter medium in such apparatus must be highly durable and dimensionally stable, it it the common practice to fabricate the filter medium from coarse but strong filaments resulting in a fairly open mesh or percent open area. Even if less open area could be achieved in the filter medium, a relatively high degree of open area is desirable in order to prevent plugging the filter and to obtain acceptable drainage rates. For example, filter mediums suitable for use in the invention are illustratively made from fabrics ranging in filament size from about 16 to 24 mils at meshes of 20 to 26 filaments per inch. A common fabric used is woven polyester monofilament.

As the dilute slurry 14 is deposited on the filter medium, the liquid phase will pass freely through the medium and, because of the percentage open area, some of the pulp solids will also pass through, especially during the early stages of mat formation. Illustratively, anywhere from about 0.1 to 1½% of the pulp (dry basis) in the feed slurry 14 may pass through the filter medium. This represents a potential significant loss of valuable pulp which must be recovered. For example, at the current price of about $300/ton, loss of 1½% could represent a daily pulp loss of about $4,500 in a 1,000 ton per day plant, a typical commercial size operation.

This pulp which breaks-through the filter is recovered by a recycle loop. Thus, as the dilute feed 14 is deposited on the advancing filter medium 17, a portion of the digester liquor present therein and small amounts of pulp are sucked through the filter media (stream 50) into vacuum pan 18 and from there into tank 24. This material, which is in effect a pulp slurry of very low consistency, e.g., about 0.004 to 0.06%, is then recycled as stream 12 to serve as the diluent for the digester stock 10.

As digester liquor is sucked from the dilute feed slurry 14 deposited on the filter medium, the consistency of the deposited slurry increases, eventually forming a pulp mat 36 on the medium. However, unless the amount of liquor removed from the slurry at this stage is carefully controlled, so much can be removed as to overburden the recycle loop to the point where it becomes necessary to purge material from the loop. This purged material of course would include at least a portion of the pulp which "breaks through" the filter medium. For this reason, a purge would normally be unacceptable since it would necessitate a loss of pulp or else a separate pulp recovery system which was independent of the recycle loop.

It has been found that this undesirable situation is avoided, however, if only enough liquor is sucked from the dilute slurry 14 deposited on the filter medium 17 to increase its consistency to the point where its value is at or below the consistency of the undiluted digester stock. Thus, for example, if the digester stock was available at 12% consistency and was diluted to 3% consistency prior to feeding it to the filter medium, only enough liquor would be sucked out by vacuum pan 18 to increase the consistency up to a maximum of about 12%. Were the consistency to be increased above 12%, digester liquor would quickly build up in the recycle loop necessitating an undesirable purge to keep the loop in balance. This would occur because the filtering step would be supplying more liquor to the recycle system then was needed in order to dilute the digester stock from 12 to 3%. By drawing the slurry down to a consistency of 12%, the recycle loop will remain in balance since the filtering step will then remove the precise amount of diluent previously added to the digester stock 10 upstream of the filter 15 to reduce its consistency from 12 to 3%. On the other hand, if the slurry is drawn down to to a consistency of less than 12%, the recycle loop would operate at a deficiency since only a portion of the diluent previously added to dilute the digester stock 10 from 12 to 3% would be recovered for recycle.

A deficiency in the recycle loop, however, is readily remedied by adding make-up liquor to the recycle loop, from any convenient source such as, for example, the recovered digester liquor 43 of the process, in amount sufficient to remedy the deficit.

While the ideal situation would be to remove only enough liquor to raise the consistency of the feed 14 from 3% back up to the 12% digester consistency, and thus have the recycle system in exact balance, the practicalities are that such precise control on a belt filtering apparatus is usually not feasible. Consequently, it is preferred to aim for a consistency somewhat below the digester consistency but as close to the digester consistency as possible without the risk of overshooting the digester consistency from time to time. In short, the consistency of the diluted feed slurry 14 is preferably increased during the mat-forming stage to a value as close as possible to the digester consistency at which the recycle loop can be operated without the need for purging.

Generally, it is preferred to increase the consistency of the diluted feed slurry 14 deposited on the filter medium 17 to about 85-95 percent the digester consistency, and preferably to about 90 to 95 percent the digester consistency. Stated somewhat differently, it is preferred that the consistency of slurry 14 be increased to a consistency about 0.5 to 2 percentage points lower than the digester consistency and preferably to a consistency about 0.5 to 1 percentage points less than the digester consistency. Thus, if the digester consistency was 12%, the consistency of the feed slurry 14 would be increased to about 10 to 11.5% and preferably to about 11 to 11.5%.

For the preferred case, where the recycle loop is deficient because the feed slurry 14 is raised to a consistency just below the digester consistency, a portion 52 of the recovered digester liquor 43 of the process is added to the recycle loop as make-up in the amount necessary to compensate for the fact that the filtration step is removing for recycle less liquor than is required in the upstream dilution of the digester slurry. This can be conveniently done by the use of a conventional level control device 54 which monitors the liquor level in tank 24 and, upon the level in tank 24 falling below a preset norm, sends a signal to a control valve 55 on the recovered product liquor line being withdrawn from the process to admit enough of product liquor 43 into tank 24 to restore the level to the pre-set norm.

It can now be appreciated that by controlling the extent of increase in consistency of the undiluted feed slurry 14 in the filtration step, all the pulp which breaks through the filter medium during this step is recycled to the system and recovered. This occurs because the recycle loop is deliberately maintained either in balance or underloaded, but never overloaded. As a result, there is no build-up in the recycle loop which would necessitate a purge from the loop to maintain stable conditions, a purge which would remove from the system some of the valuable break through pulp. To recover this purged pulp would necessitate an entirely separate reclamation system. Using the present invention, this problem is eliminated and all the break through pulp is recovered, for essentially 100% pulp recovery within a single processing scheme. While it might normally be expected that the more desirable situation would be to remove as much liquor as possible from the feed slurry 14 during the filtration, in order to reduce the extent of subsequent treatments needed to recover the residual liquor, the present invention deliberately avoids this expedient to provide a unique recycle loop whereby all the break through pulp is recovered.

Once the pulp mat 36 of a consistency not exceeding that of the undiluted feed slurry 10 has been formed on the filter medium 17, the mat is then subjected to counter-current washing with a washing liquid such as water. As shown in FIG. 1, five separate counter current washing stages are used, with fresh wash liquid 37, e.g., warm water, being fed to the last stage (headbox 35) and the filtrate 56 from the first stage constituting the final recovered digester liquor 43 which is then sent on for further processing.

The number of wash stages used can vary. Normally at least three stages are desirable. The filtrate from each wash stage except the first is collected in tanks 26–29 and then reused as the wash liquid for the immediately preceding stage in typical counter-current fashion.

The amount of fresh wash liquid 37 required depends upon a balancing of the percent recovery of digester liquor desired and the extent of dilution which is permissible. These factors can vary considerably from operation to operation. Ideally, only enough fresh wash liquid 37 is supplied to the final wash stage to displace all the digester liquor in the mat with substantially no dilution whatever. This, of course, assumes essentially 100% plug-flow of the wash liquid through the filter cake. Accordingly then, if a high degree of digester liquor recovery is desired, the amount of fresh wash used should be at least about 1.0 times the amount of liquid in the pulp mat leaving the final stage. Of course, if less efficient recovery of the digester liquor is tolerable, wash liquid in an amount less than 1.0 times could be used, in which case some digester liquor will probably remain in the mat 36 as it leaves the filter, the amount depending largely on how much fresh wash liquid was used. On the other hand, the amount of fresh wash liquid used can exceed the 1.0 times theoretical amount needed for complete displacement. How much excess wash liquid can be used will depend upon the extent of dilution which can be tolerated in the recovered digester liquor. The degree of dilution will be directly proportional to the amount of excess wash liquid used, and generally the amount of fresh wash liquid used should not exceed about 1.25 times the amount of liquid in the pulp mat leaving the last stage. Preferably, the amount of fresh wash liquid 37 fed to the final wash stage is about 1.05 to 1.12 times the amount of liquid in the pulp mat 17 leaving the last stage, and even more preferably as close to about 1.05 as possible.

It will now be apparent that under preferred conditions of operation the vast majority of the fresh wash liquid 37 remains in the pulp mat 36 and leaves the system with the mat leaving the last stage. Consequently very little wash liquid finds its way into the displaced digester liquor so that the recovered liquor 43 is in a substantially undiluted condition. Under the preferred conditions of this invention, substantially all the digester liquor, e.g., 95% or more, present in the diluted feed slurry 14 can be recovered with minimal dilution. In one case, for example, the recovered digester liquor 43 was only diluted from 14% dissolved solids at the digester to 13.22%. This indicates the entry of only about 6 pounds of wash water diluent into every 100 pounds of undiluted digester liquor recovered during the recovery operation, for a total dilution of only 6%. Generally, digester liquor recovered by the process of the invention is diluted to only about 5 to 12%, and usually toward the low end of this range. In contrast, when drum filters are used to recover the digester liquor, as described above, dilution of the recovered liquor can routinely be as high as 25 to 30%, and normally with a lower percent recovery of the liquor in the diluted feed slurry.

The vacuum system of the horizontal belt filter 15 can operate at variable vacuum pressures depending upon such factors as the material being processed, the nature of the filtering medium, and the desired rate of drainage. Generally where foaming is a problem, a vacuum in excess of about 9 inches of mercury is avoided. Illustratively, the vacuum system operates at vacuums of about 5 to 9 inches of mercury, and preferably at about 6.5 to 7.5 inches of mercury.

The rate of advance of the filter medium 17 can vary considerably. Generally speeds of about 30 to 80, and preferably about 50, feet per minute suffice. Loading of the filter medium can vary from about 3 to 7 pounds of pulp (dry basis) per square foot.

The thickness of the pulp mat 36 during the mat-formation stage and subsequent washing stages can vary considerably. Generally, it is desirable to operate with as thick a mat as possible consistent with the ability to obtain an acceptable drainage rate. If a mat becomes too thick, the fines therein tend to become packed against the filter medium causing plugging. Illustratively, mat thickness can vary from about 1 to 8 inches, and preferably is about 2 to 6 inches.

Once the mat-forming stage is completed, it no longer becomes as important to control the consistency of the mat since there is no significant break-through of pulp at this point. Therefore, the mat consistency may increase during washing to a value well above that permissible during the initial mat-forming stage. Illustratively, mat consistency can increase during washing or other subsequent treatment to as much as about twice that of the undiluted digester slurry 10 and typically falls within the range of about 12 to 25%.

The amount of fresh wash liquid 37 fed to the final washing stage is automatically and continuously controlled in response to the concentration of the liquor 41 displaced from the mat in the final washing stage. If this liquor is too diluted less fresh wash liquid is needed and if too concentrated more fresh wash liquid is needed.

The electrical conductivity of a digester liquor is proportionally reponsive to variations in the sodium ion concentration of the liquor. Typical ions found in digester liquors include sodium, calcium and magnesium ions, the particular ion or ions involved depending for the most part on the nature of the pulp process being used. The ion concentration in turn is proportionally related to the total dissolved solids in the liquor. As a result, digester liquor concentration can be conveniently determined by measuring the electrical conductivity of the liquor and then comparing the measured value against an appropriate calibration curve to determine the actual concentration of the liquor.

Thus the electrical conductivity of the liquor 41 in tank 29 is measured using an electrical conductivity cell 57. The measured electrical conductivity is then set in the form of an electrical signal to a controller 58 where it is compared with a desired norm pre-set into the controller circuitry, i.e., the electrical conductivity corresponding to the desired concentration of digester liquor in the liquid 41 displaced from the mat in the final washing stage. This comparison produces a deviation from the norm which is then used to control the amount of fresh wash liquid 37 fed to the last wash stage. A signal corresponding to the determined deviation is set to an automatic control valve 59 which is adapted to open or close proportionately in response to the signal. If there is no deviation, the controller will send a neutral signal to the control valve which will maintain it in its pre-existing desired condition. If there is a negative deviation, i.e., the measured concentration of the digester liquor 41 is too low, the controller will send a negative signal to the control valve 59 causing it to close proportionately thereby supplying less fresh wash liquid and reducing the extent of the deviation. If there is a positive deviation, i.e., the digester liquor 41 is too concentrated, the control valve 59 will open proportionately thereby supplying more fresh wash liquid and reducing the extent of the deviation. The ultimate result is a system which responds almost instantaneously to upsets or other transient conditions to thereby more quickly restore the system to equilibrium or steady state operation.

The electrical conductivity measuring device 57, the controller 58, the control valve 59 and various associated circuitry are items readily available commercially. The control valve 59, for example, can be a conventional electrically operated valve such as a solenoid valve, or a pneumatically operated valve. The controller 58 can be any of numerous known devices designed to receive an input signal from an electrical conductivity measuring cell, compare the signal with a pre-set acceptable norm and then transmit to a control valve an output signal (either electrical or pneumatic) which is proportionate to the calculated deviation.

One suitable electrical conductivity control system is available from Foxboro Co., Foxboro, Massachusetts. Thus a Foxboro Conductivity Cell No. GD-SS-1 with a temperature compensator, Model WTX, can be used as the electrical conductivity measuring device 57. Temperature compensation is necessary since the electrical conductivity of liquor 41 is responsive to ion level and temperature. By automatically compensating for temperature fluctuations, the input signal sent to the controller 58 is a measure of ion level only. A suitable controller 58 is the Foxboro Resistance Dynalog for Conductivity Measurement, Model No. 9460 AC-A4, a device whose input is electrical and its output pneumatic. Foxboro Model V9000 Two-Way Ball Control Valve having an input signal range of 3 to 15 psi has been found to be a suitable control valve 59.

With the amount of fresh wash liquid 37 being fed to the final wash stage being almost instantaneously and automatically responsive to even slight changes in the concentration of the liquor 41, the wash system can be more readily controlled and is more quickly responsive toward upsets to the system. The automatic control system is especially beneficial during start-up because it greatly reduces the time necessary to reach steady-state operation.

As pointed out above, the liquor drawn down into tanks 24–29 has a pronounced tendency to foam. To avoid losing this foam through the exhaust of the vacuum system, the vacuum stream 60 with its entrained foam from the liquid in tanks 24–29 is sent to a defoamer 61 where the foam is collapsed and separated from the gaseous vacuum exhaust. Thus, the vacuum stream 60 can be fed to any of a number of commercially available defoamers or entrainment separators. The preferred type of entrainment separators operate on the principle of propelling the entrained foam in the gas stream 60 against a surface at high velocities whereby the impact with the surface collapses to foam to a liquid which then trickles down the surface where it can be collected and separated from the gas stream. One suitable defoamer 61 is the Anderson Low Pressure Line Purifier Type L20 available from the V. D. Anderson Company, Cleveland, Ohio.

The defoamed digester liquor 63 is then returned to tank 25 where it is blended with the recovered digester liquor 43 of the process. The foam-free vacuum exhaust 64 is then sent to a scrubber 65 where it is contacted with water 66 to cool it and remove condensibles 67. It is then vented to exhaust through the vacuum pump 68. By defoaming the vacuum exhaust as just described, prior to venting it, losses of digester liquor from the system are substantially reduced. In general, the use of the defoamer reduced digester losses from foaming from the 2 to 13% down to anywhere from substantially none to about 5% and in most cases to about 0.1% to 0.2%.

FIGS. 2–6 show schematically a typical horizontal belt filtering apparatus incorporating the modification of the present invention. The various headboxes are feedboxes conventionally associated with such devices have been omitted in most of the drawings for purposes of clarity. Normally one or more of these headboxes would be disposed in series directly over the moving filter belt as shown in FIGS. 1 and 6, to deposit a feed slurry or treatment liquid on the belt, as desired. Note in particular headbox 103 in FIG. 6.

Figure 2:
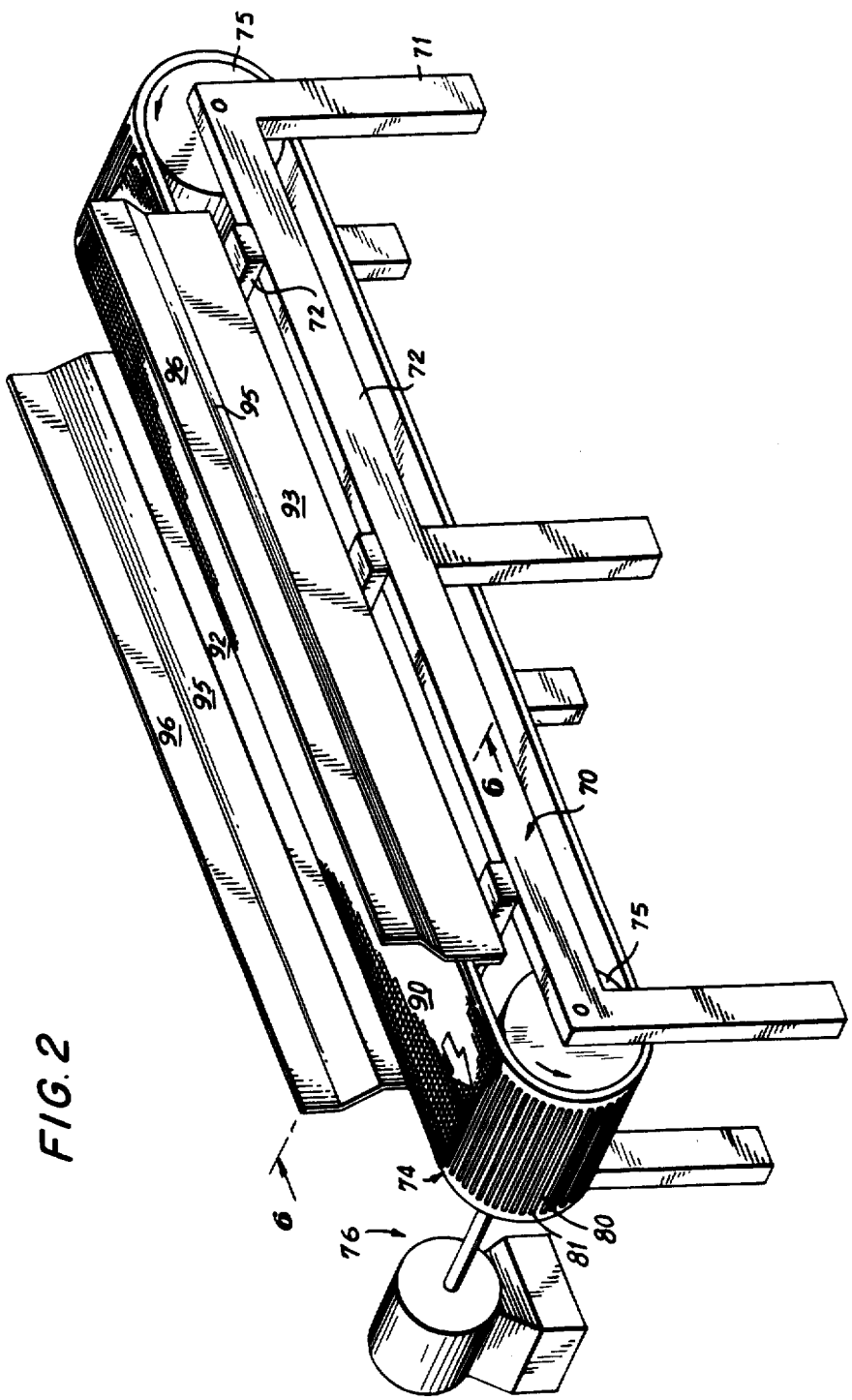
FIG. 2 is a schematic illustration in perspective of a conventional horizontal belt filtering apparatus incorporating the improvement of the present invention, with certain parts omitted for purposes of clarity and the filtration surface partly cut-away to show the ribbed filter belt which supports the filter medium.

A typical belt filtering apparatus comprises a frame 70 (see FIG. 2) usually formed from a plurality of interconnected vertical members 71 and horizontal members 72, and a substantially horizontal endless rubber filter belt 74 propelled by rollers 75 which are rotatably mounted to the frame. One of the rollers is driven in conventional fashion as by a motor-driveshaft arrangement generally designated as 76 or in any other suitable manner such as by a pulley system. The belt 74 is supported by a table 77 (best shown in FIGS. 3 and 6) which is mounted to the frame in any suitable fashion. For example, table 77 can be mounted on the horizontal members 72 of the frame as shown in FIGS. 2 and 6. The table 77 can be additionally supported by additional vertical members of the machine frame (not shown).

The filter belt 74 (see FIGS. 3–6) contains a plurality of spaced protruding ribs 80 which define between them a plurality of dished chambers 81 each having at its center a drain opening 82 passing through the entire thickness of belt 74. The underside of belt 74 is provided with several depending runners 83 which cooperate with recessed tracks 84 formed in table 77 to guide the belt as it advances. The centrally disposed runner 83 fits in a track 84 whose bottom is formed by the upper surface of a vacuum pan 85. The vacuum pan 85 is provided with a plurality of openings 86 which cooperate with the openings 82 in belt 74 whereby vacuum can be applied through the openings to chambers 82. Pan 85 is provided with a drain 88 (FIG. 4) which connects to a vacuum source.

Disposed on top of the belt 77, supported by ribs 80, is the filter medium 90 on top of which is deposited the material to be processed or a treatment liquid, as the case may be. In operation, the belt 74 advances in sliding relationship with the table 77, guided by the cooperation of runners 83 and tracks 84. Belt 74 carries the filter medium 90 with it. As the belt apertures 82 slide across the apertures 86 of the vacuum pan 85, vacuum is applied to the filter medium causing the liquid in the material deposited on the filter medium 80 to be sucked through the filter medium into chambers 81 and out apertures 82 and 86 into the vacuum pan 85 (as shown by the arrows in FIG. 4), from which the filtrate is sent to a hold tank or other receptacle through the drain 88 in the vacuum pan (see, for example, tanks 24–29 in FIG. 1).

Integrally joined to opposed edges of the table 77 separate from belt 74 are wall members 92, 93 which rise substantially vertically erect to form with said table 77 a trough in which the belt 74 is disposed. Wall members 92, 93 are in close fitting relationship with the edges of belt 74 and rise to a height above that of the belt. The objective of the wall members 92, 93 is to contain the material deposited on the belt 74 and filter medium 90 so that the edges of the belt and filter medium will be immersed in the material. This provides an effective liquid seal at the edges which prevents breaking the vacuum. For this reason, wall members 92, 93 should rise to a height sufficient to contain the material deposited on the filter medium between the members 92, 93 to form on top of the medium 90 a continuous layer of material from wall member 92 to wall member 93.

For the case where the material deposited on the filter medium 90 is the feed slurry fed to the apparatus, for example stream 14 in FIG. 1, the slurry forms a continuous layer 91 across the belt 74 and filter medium 90, as shown in FIGS. 3-5, whereby the liquid portion of the slurry forms an effective liquid seal at the edges of the belt and filter medium. This seal effectively prevents leaks at several vulnerable leak points such as those labelled 98 in FIG. 3. For example, leakage between the edges of belt 74 or filter medium 90 and walls 92, 93 is eliminated as is leakage between the adjoining extremities of belt 74 and filter medium 90 and leakage between the underside of belt 74 and the adjoining surface of tray 77.

For the case where the material deposited onto the apparatus is wash liquid 100 (see FIG. 6) or other treatment liquid which is deposited onto a pre-existing layer of material such as mat 91, the liquid forms a continuous layer 101 across the mat 91, belt 74 and filter medium 90, as shown in FIG. 6, whereby the liquid layer 101 forms an effective liquid seal at the edges of the belt and filter medium. This seal effectively prevents leaks at several vulnerable leak points such as those labelled 102 in FIG. 6.

Each of the wall members 92, 93 contains an upper portion 95 which flares outwardly from the other (see FIG. 6) to provide on each side surfaces which slope downwardly toward belt 74. Flared portions 95 then resume their substantially vertically upright position in portions 96 as they continue to rise. Portions 96, however, are disposed at a point more distant from the filter belt than the vertically erect lower wall members 92, 93. Portions 95 and 96 permit material such as a slurry or wash liquid 100 to be applied to belt 74 by one or more headboxes 103 (see FIG. 6) which are wider than belt 74, without losing a portion of the material as spillage over the side of the belt or wall members 92, 93. Thus material 100a from the extremities of the headbox 103 is collected by the flared portions 95 (see FIG. 6) and deposited on the mat 91 or the filter medium 90, as the case may be, in such manner that a continuous layer of material 101 is maintained across the surface of the mat 91 or filter medium 90 from wall member 92 to wall member 93, thus insuring complete covering of the filter medium 90 or mat 91 as the case may be, from one extremity to the other, and maintenance of the liquid seal at the edges of the belt and filter medium.

The wall members 92, 93 form in conjuction with table 77 a U-shaped trough in which the belt 74 and filter medium 90 are disposed so that when material is deposited onto the apparatus, wall members 92, 93 contain it and create a continuous layer of material entirely across the filtration surface. As a result, the edges of the belt and filter medium remain submerged in material throughout the operation of the apparatus whereby a liquid seal of the edges is achieved. This seal prevents leaks at or near these edges which could break the vacuum during the operation of the apparatus.

As can now be appreciated, the present invention solves many of the problems associated with the operation of horizontal belt filter systems, and enhances the usefulness of the system as a vehicle for processing slurries of cellulosic mateials.

The specific information presented above was by way of illustration only and such alterations and modifications thereof as would be apparent to those skilled in the art are deemed to fall within the scope and spirit of the present invention, bearing in mind that the invention is defined only by the following claims.

What is claimed is:

1. A process for treating a slurry of cellulosic material which comprises:
    a. diluting the slurry to reduce its consistency to a flowable level;
    b. depositing the diluted slurry on a surface permeable to the liquid and solid phases thereof but which is substantially more permeable to the liquid phase;
    c. subjecting the deposited slurry to a pressure differential, whereby more of the liquid phase thereof than the solid phase passes through the permeable surface to increase the consistency of the slurry to a value between the consistency of the diluted slurry deposited on the surface and the consistency of the slurry prior to its dilution, thereby forming a mat of cellulosic material on said surface;
    d. recycling substantially all of the liquid and solids which pass through the surface for use as the slurry diluent in step (a);
    e. counter-currently applying a treating liquid in a plurality of treatment stages, including application of a fresh treating liquid in the last stage of said treatment stages, to the mat of cellulosic material, while the mat remains on the permeable surface and subject to the pressure differential, whereby the treating liquid displaces at least a portion of liquid present in the mat from the mat and through the permeable surface in each treatment stage;
    f. measuring the electrical conductivity of the liquid displaced from the mat in the last stage of said treatment stages and then
    g. adjusting the amount of fresh treating liquid applied in the last stage of said treatment stages in response to the deviation, from a predetermined norm, of the measured value of electrical conductivity of only the liquid displaced in the last stage of said treatment stages.

2. The process of claim 1 wherein said slurry is the output of a digester comprising pulp solids and a digester liquor, the treating liquid is an aqueous wash liquid, and the liquid displaced from the mat by the wash liquid in the last stage of the counter-current wash contains digester liquor.

3. The process of claim 2 wherein at least three stages are employed in the counter-current wash.

4. The process of claim 2 wherein the amount of fresh wash liquid used is about 1.05 to 1.12 times the amount of liquid present in the mat leaving the last stage.

5. The process of claim 2 wherein the permeable surface is a substantially horizontal, advancing surface.

6. The process of claim 5 wherein the pressure differential is created by a vacuum.

7. The process of claim 2 wherein the liquid displaced in the first stage of the counter-current treatment is recovered.

* * * * *